US006958376B2

(12) United States Patent  
Muldowney

(10) Patent No.: US 6,958,376 B2  
(45) Date of Patent: Oct. 25, 2005

(54) INLET DISTRIBUTION DEVICE FOR UPFLOW POLYMERIZATION REACTORS

(75) Inventor: Gregory P. Muldowney, Glen Mills, PA (US)

(73) Assignee: Exxonmobil Chemical Patents Inc., Houston, TX (US)

( * ) Notice: Subject to any disclaimer, the term of this patent is extended or adjusted under 35 U.S.C. 154(b) by 10 days.

(21) Appl. No.: 10/659,126

(22) Filed: Sep. 10, 2003

(65) Prior Publication Data

US 2004/0082739 A1 Apr. 29, 2004

Related U.S. Application Data

(60) Provisional application No. 60/420,996, filed on Oct. 24, 2002.

(51) Int. Cl.[7] .................................................. C08F 2/00
(52) U.S. Cl. ............................. 526/90; 526/68; 526/89; 526/920; 422/131; 422/139
(58) Field of Search ............................. 526/68, 89, 90, 526/920, 88; 422/131, 139, 140, 145; 366/165.2, 165.5

(56) References Cited

U.S. PATENT DOCUMENTS

| | | | |
|---|---|---|---|
| 4,877,587 A | 10/1989 | Rhee et al. | 422/135 |
| 5,804,677 A | 9/1998 | Chinh et al. | 526/68 |
| 6,117,399 A | 9/2000 | Jorgensen et al. | 422/142 |
| 6,139,805 A * | 10/2000 | Nagato et al. | 422/143 |
| 6,669,915 B1 * | 12/2003 | Boyd et al. | 422/224 |

FOREIGN PATENT DOCUMENTS

| | | | |
|---|---|---|---|
| EP | 0088638 | 9/1983 | B01J/8/18 |
| EP | 0721798 | 7/1996 | B01J/8/44 |
| GB | 2271727 | 4/1994 | B01J/8/44 |
| WO | WO 95/17952 | 7/1995 | B01J/8/44 |

\* cited by examiner

Primary Examiner—Fred Teskin
(74) Attorney, Agent, or Firm—Maria C. Walsh

(57) ABSTRACT

A polymerization process and polymerization reactor are provided. For example, a polymerization process is described, including passing a feed stream including liquid and gas through a feed stream inlet disposed proximate an upflow polymerization reactor, passing the feed stream through a member configured to impart an angular velocity to the feed stream and entrain the liquid in the gas, and contacting the feed stream with a catalyst to polymerize the feed stream. The upflow polymerization reactor includes a housing having a lower region and an upper region, the upper region and lower region being separated by a catalyst bed, a feed stream inlet disposed proximate the lower region of the housing configured to pass a feed stream therethrough comprising liquid and gas, a fluid outlet disposed proximate the upper region of the housing, and a member mounted in the housing between the feed stream inlet and the catalyst bed having a plurality of apertures positioned at an angle of greater than about 0 degrees and less than about 90 degrees from horizontal.

20 Claims, 3 Drawing Sheets

INLET DISTRIBUTION DEVICE FOR UPFLOW POLYMERIZATION REACTORS

CROSS-REFERENCE TO RELATED APPLICATIONS

The present application claims the benefit of U.S. Provisional Application No. 60/420,996, filed Oct. 24, 2002, said application hereby incorporated herein by reference.

BACKGROUND OF THE INVENTION

1. Field of the Invention

The present invention relates to the polymerization of ethylene.

2. Description of the Related Art

Methods for forming polyethylene can include passing a mixed phase ethylene feed stream to a fluidized bed reactor. Fluidized bed reactors may experience inadequate entrainment of the liquid phase in the gas phase of the ethylene feed stream. Inadequate entrainment may result in plugging of the distribution plate that supports the catalyst within the fluidized bed reactor. Plugging may result in a reduced polymerization rate. Therefore, it would be highly desirable to form polyethylene in a fluidized bed reactor without encountering many of the problems associated with upflow reactors.

SUMMARY OF THE INVENTION

In certain embodiments, a polymerization process includes passing a feed stream including liquid and gas through a feed stream inlet disposed proximate an upflow polymerization reactor. The polymerization process further includes passing the feed stream through a member configured to impart an angular velocity to the feed stream, and contacting the feed stream with a catalyst to polymerize the feed stream.

Other embodiments include a polyethylene polymerization process including passing a ethylene feed stream including a liquid and gas mixture that includes ethylene monomers through a feed stream inlet disposed proximate an upflow polymerization reactor and passing the ethylene feed stream through a member configured to impart an angular velocity to the ethylene feed stream and further mix the liquid in the gas, providing an entrained ethylene feed stream. The method may further include contacting the entrained ethylene feed stream with a catalyst to polymerize the monomers and to form polyethylene. Preferably, the feed stream includes less than about 25% liquid.

In certain embodiments, the member is substantially flat and includes a plurality of apertures, the feed stream passing through the plurality of apertures, wherein the member imparts the angular velocity to the feed stream.

In certain embodiments, the member includes a housing having an aperture with a stationary vane wherein the feed stream passes through the plurality of apertures, thus imparting the angular velocity to the feed stream.

In yet other embodiments feed stream passing through the member has substantially the same angular velocity at different radial member locations.

In other embodiments, the feed stream passing through the member has multiple angular velocities at different radial member locations.

Other embodiments include an upflow polymerization reactor. The upflow polymerization reactor may include a housing having a lower region and an upper region, the upper region and lower region being separated by a catalyst bed, a feed stream inlet disposed proximate the lower region of the housing configured to pass a feed stream therethrough including liquid and gas, and a fluid outlet disposed proximate the upper region of the housing. The upflow polymerization reactor may further include a member mounted in the housing between the feed stream inlet and the catalyst bed comprising a plurality of apertures positioned at an angle of greater than about 0 degrees and less than about 90 degrees from horizontal.

In other embodiments, the apertures are positioned at an angle of from about 30 degrees to about 60 degrees from horizontal.

In yet other embodiments, the apertures are positioned at substantially the same angle from horizontal.

In still other embodiments, the apertures are positioned at different angles from horizontal.

DETAILED DESCRIPTION OF THE PREFERRED EMBODIMENT

Various specific embodiments, versions and examples of the invention will now be described, including preferred embodiments and definitions that are adopted herein for purposes of understanding the claimed invention. It is understood, however, for purposes of determining infringement, that the scope of the "invention" will refer to the appended claims, including their equivalents, and elements or limitations that are equivalent to those that are recited. All references to the "invention" below are intended to distinguish claimed compositions and methods from compositions and methods not considered to be part of this invention. It is understood, therefore, that any reference to the "invention" may refer to one or more, but not necessarily all, of the inventions defined by the claims. References to specific "embodiments" are intended to correspond to claims covering those embodiments, but not necessarily to claims that cover more than those embodiments.

Figure 1:
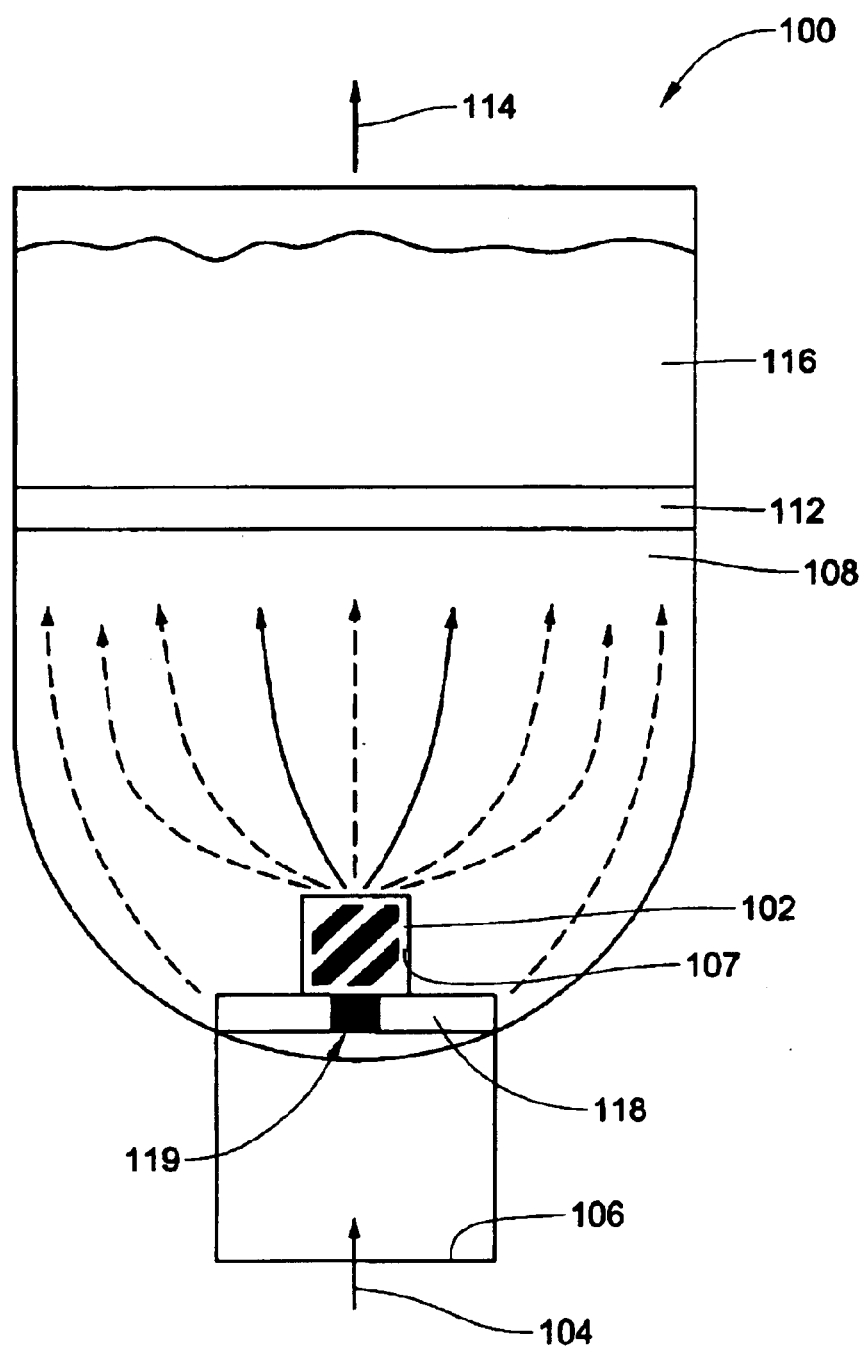
FIG. 1 illustrates a plan view of an upflow polymerization reactor.

Embodiments of the invention include a polymerization process. The polymerization process includes passing a feed stream having liquid and gas phase monomers through a feed stream inlet disposed proximate an upflow polymerization reactor. FIG. 1 illustrates a plan view of an upflow polymerization reactor. The feed stream 104 preferably include a fluidizing gas, such as a gas including olefin monomers. Preferably, the feed stream 104 includes ethylene or ethylene monomers, or a combination thereof. More preferably, the olefin feed stream 104 includes ethylene monomers. The feed stream may include ethylene in an amount greater than about 95 weight percent (wt. %). In addition, the feed stream 104 is a mixture of vapor and liquid, which may include from about 0.4 weight percent to about 25 weight percent liquid. That is, from about a 0.4% to about 25 % of the olefin is condensed. The polymerization reactor 100 may include any upflow reactor capable of polymerizing an olefin with a fluid bed of catalyst, such as a fluidized bed reactor. An example of a fluidized bed reactor 100 is the Unipol reactor, commercially available from Union Carbide of Danbury, Conn. The polymerization reactor 100 includes a housing and a feed stream inlet 106 configured to receive the feed stream 104. In addition, although the feed stream inlet 106 may include any hardware capable of introducing a mixed phase stream into a reactor, typically, the feed stream inlet 106 includes a conduit operably connected to the housing. The housing preferably has a mixing zone 108, where the monomers are mixed, and a reaction zone 116, where most or all of the polymerization takes place. A distributor plate 112 may be positioned inside the housing.

The distributor plate 112 preferably includes a plurality of perforations (not shown) configured to facilitate the passage of the feed stream 104 therethrough. The distributor plate 112 preferably extends across the entire cross-sectional area of the polymerization reactor 100, and preferably separates the mixing zone 108 from the reaction zone 116. Upon passing through the plurality of perforations, the feed stream 104 contacts a catalyst supported by the distributor plate 112. The catalyst is preferably located in the reaction zone 116, and operates to promote polymerization of the olefin monomers to form a polyolefin product stream 114, preferably a polyethylene product stream. The catalyst may be one of a number of catalysts capable of polymerizing a polyolefin in a fluidized bed reactor known to those skilled in the art. Preferably, when ethylene monomers are employed, the catalyst includes a supported metallocene, such as PX-627, commercially available from ExxonMobil Chemical Co., Baytown, Tex. Preferably, the support is high temperature calcinated silica. In an embodiment, suitable metallocene compounds are represented by the formula:

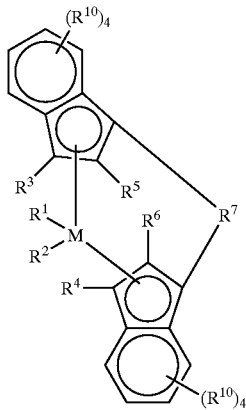

wherein: M is a metal of Group 4, 5, or 6 of the Periodic Table preferably, zirconium, hafnium and titanium, most preferably zirconium;

$R^1$ and $R^2$ are identical or different, preferably identical, and are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen atom, preferably chlorine; or a conjugated diene which is optionally substituted with one or more hydrocarbyl, tri(hydrocarbyl)silyl groups or hydrocarbyl, tri(hydrocarbyl)silylhydrocarbyl groups, said diene having up to 30 atoms not counting hydrogen;

$R^5$ and $R^6$ are identical or different, preferably identical, are one of a hydrogen atom, a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein: $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group;

$R^7$ is

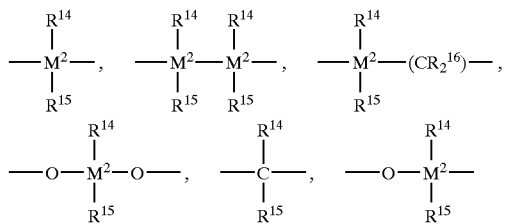

—$B(R^{14})$—, —$Al(R^{14})$—, —Ge—, —Sn—, —O—, —S—, —SO—, —$SO_2$—, —$N(R^{14})$—, —CO—, —$P(R^{14})$—, or —$P(O)(R^{14})$—;

wherein: $R^{14}$, $R^{15}$ and $R^{16}$ are identical or different and are a hydrogen atom, a halogen atom, a $C_1$–$C_{20}$ branched or linear alkyl group, a $C_1$–$C_{20}$ fluoroalkyl or silaalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{14}$ and $R^{15}$, together with the atoms binding them, form a cyclic ring;

preferably, $R^{14}$, $R^{15}$ and $R^{16}$ are identical and are a hydrogen atom, a halogen atom, a $C_1$–$C_4$ alkyl group, a $CF_3$ group, a $C_6$–$C_8$ aryl group, a $C_6$–$C_{10}$ fluoroaryl group, more preferably a pentafluorophenyl group, a $C_1$–$C_4$ alkoxy group, in particular a methoxy group, a $C_2$–$C_4$ alkenyl group, a $C_7$–$C_{10}$ arylalkyl group, a $C_8$–$C_{12}$ arylalkenyl group, or a $C_7$–$C_{14}$ alkylaryl group;

or, $R^7$ is represented by the formula:

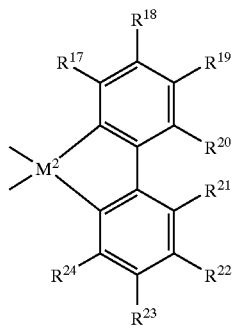

wherein: $R^{17}$ to $R^{24}$ are as defined for $R^1$ and $R^2$, or two or more adjacent radicals $R^{17}$ to $R^{24}$, including $R^{20}$ and $R^{21}$, together with the atoms connecting them form one or more rings; preferably, $R^{17}$ to $R^{24}$ are hydrogen;

$M^2$ is carbon, silicon, germanium or tin;

the radicals $R^3$, $R^4$, and $R^{10}$ are identical or different and have the meanings stated for $R^5$ and $R^6$, or two adjacent $R^{10}$ radicals are joined together to form a ring, preferably a ring containing from about 4–6 carbon atoms.

Methods for supporting metallocene catalysts are described in WO 9950311, U.S. Pat. Nos. 5,643,847 and 5,972,823 each fully incorporated herein by reference and in their entirety.

The catalyst systems used to prepare the compositions of this invention are preferably supported using a porous particulate material, such as for example, talc, inorganic oxides, inorganic chlorides such as magnesium chloride, and resinous materials such as polyolefin or polymeric compounds.

Preferably, the support materials are porous inorganic oxide materials, which include those from the Periodic Table of Elements of Groups 2, 3, 4, 5, 13 or 14 metal/metalloid oxides. Silica, alumina, silica-alumina, and mixtures thereof are particularly preferable. Other inorganic oxides that may be employed either alone or in combination with the silica, alumina or silica-alumina are magnesia, titania, zirconia, and the like.

Preferably the support material is porous silica which has a surface area in the range of from 10 to 700 $m^2/g$, a total pore volume in the range of from 0.1 to 4.0 cc/g and an average particle size in the range of from 10 to 500 $\mu$m. More preferably, the surface area is in the range of from 50 to 500 $m^2/g$, the pore volume is in the range of from 0.5 to 3.5 cc/g and the average particle size is in the range of from 20 to 200 $\mu$m. Most desirably the surface area is in the range of from 100 to 400 $m^2/g$, the pore volume is in the range of from 0.8 to 3.0 cc/g and the average particle size is in the range of from 30 to 100 $\mu$m. The average pore size of typical porous support materials is in the range of from 10 to 1000 Å. Preferably, a support material is used that has an average pore diameter of from 50 to 500 Å, and most desirably from 75 to 350 Å. It may be particularly desirable to dehydrate the silica at a temperature of from 100° C. to 800° C. anywhere from 3 to 24 hours.

The metallocene and support material may be combined in any number of ways. More than one metallocene may also be used. Examples of suitable support techniques are described in U.S. Pat. Nos. 4,808,561 and 4,701,432 each fully incorporated herein by reference and in their entirety. Preferably the metallocenes are combined and their reaction product supported on the porous support material as described in U.S. Pat. No. 5,240,894 and WO 94/28034, WO 96/00243, and WO 96/00245 each fully incorporated herein by reference and in their entirety. Alternatively, the metallocenes may be preactivated separately and then combined with the support material either separately or together. If the metallocenes are separately supported, then preferably, they are dried then combined as a powder before use in polymerization.

The supported catalyst system may be used directly in polymerization or the catalyst system may be prepolymerized using methods well known in the art. For details regarding prepolymerization, see U.S. Pat. Nos. 4,923,833 and 4,921,825, and EP 0 279 863 and EP 0 354 893 each fully incorporated herein by reference and in their entirety.

The distributor plate 112 further serves to separate the mixing zone 108 from the reaction zone 116. The mixing zone 108 operates to distribute the gases passing therethrough and any entrained condensed liquid across the full cross-section of the polymerization reactor 100 prior to passing through the plurality of perforations in the distributor plate 112. The reaction zone 116 preferably includes a bed of growing polymer particles (e.g., macromers, polymerized by contacting the feed stream with the catalyst), formed polymer particles, and the catalyst, hereinafter referred to collectively as a "fluidized bed." The catalyst is fluidized in the reaction zone 116 by continuously flowing the olefin feed stream 104 through the plurality of perforations in the distributor plate 112, e.g., by continuously flowing polymerizable compounds, such as olefin monomers, therethrough. To maintain a viable fluidized bed, the velocity of the feed stream 104 passing through the distributor plate 112 should exceed the minimum flow required for fluidization, which is preferably from about 0.2 ft/s to about 0.5 ft/s in a polyethylene forming process. As used herein, the term "viable fluidized bed" refers to a bed in which solid catalyst particles are suspended, e.g., in the feed stream 104 in the reaction zone 116.

The polymerization process may further include passing the feed stream 104 through a plate 118 having a channel 119 disposed therein prior to passing the feed stream 104 through the distributor plate 112. The plate 118 is preferably located proximate a feed stream inlet 106. The plate 118 preferably has a circular cross section and a channel formed therein.

As indicated above, a polymerization process can include use of the apparatus 100. When used in such a process, the plate 118 preferably deflects at least a portion of the feed stream 104 to the outer wall of the vessel 100. However, the remaining portion of the feed stream 104 should pass through the channel 119 centrally disposed in the plate 118. The channel 119 preferably imparts an increased vertical velocity to the feed stream 104 mixture, thus increasing the level of entrainment in the central portion of the feed stream 104 in comparison to a feed stream 104 entering an upflow reactor without a plate disposed therein. Also, the channel 119 provides a stream 103 with more entrainment (more gas bubbles) than has the stream 105 flowing around the plate 118. The percentage of fluid, and therefore the resultant vertical velocity of the central portion, passing through the channel depends on the diameter of the channel 119. The channel 119 preferably has a diameter greater than about half of the diameter of the outer diameter of the plate 118. Consequently, the channel diameter may be sized to provide a desired vertical velocity depending on individual system requirements. Although the increased vertical velocity of the stream 103 increases entrainment of the fluid in the central portion of the mixing chamber 108, the fluid near the outer wall of the polymerization reactor 100 does not pass through the channel 119, resulting in a fluid having a lower velocity than the fluid passing through the channel 119. As a result, liquid monomer may "pool" near the reactor inlet 106, which may result in fouling of the inlet 106. In addition, the increased vertical velocity may cause plugging of the distributor plate 112 in the central region of the distributor plate 112 (the portion of the plate 118 having the portion of the feed stream 104 having the increased vertical velocity passing therethrough).

Therefore, the polymerization process preferably further includes passing the feed stream through a member 102 configured to entrain the liquid throughout the polymerization reactor 100 cross-sectional area, e.g., all of the liquid present in the upflow reactor is entrained in the gas. In addition, the member 102 operates to reduce the velocity of the central feed portion thus reducing distributor plate 112 plugging. The member 102 should be centrally disposed in relation to the plate 118 and disposed downstream of the plate 118. Accordingly, the portion of the feed stream 104 passing through the channel 119 in the plate 118 should also then pass through the member 102. Preferably, the member 102 is disposed within the mixing chamber 108 with an intervening gap 107 between the member 102 and the annular disk 118. The intervening gap 107 allows the central feed portion to bypass the member 102 upon member 102 fouling. The member 102 can be further configured to induce an angular velocity in the central flow portion, thereby uniformly entraining the liquid, e.g., entraining the liquid in the gas throughout the cross-section of the upflow reactor. In addition, the plate 118 and the member 102 are preferably mounted to limit the pressure drop in the mixing zone 108 to a pressure of less than about 6 psig. Although an increase in the pressure drop is observed with a stacked configuration, e.g., passing the feed stream 104 through both a plate 118 and a member 102 over the pressure drop observed with a plate 118 alone, the increase in pressure drop is minimized.

Figure 2B:
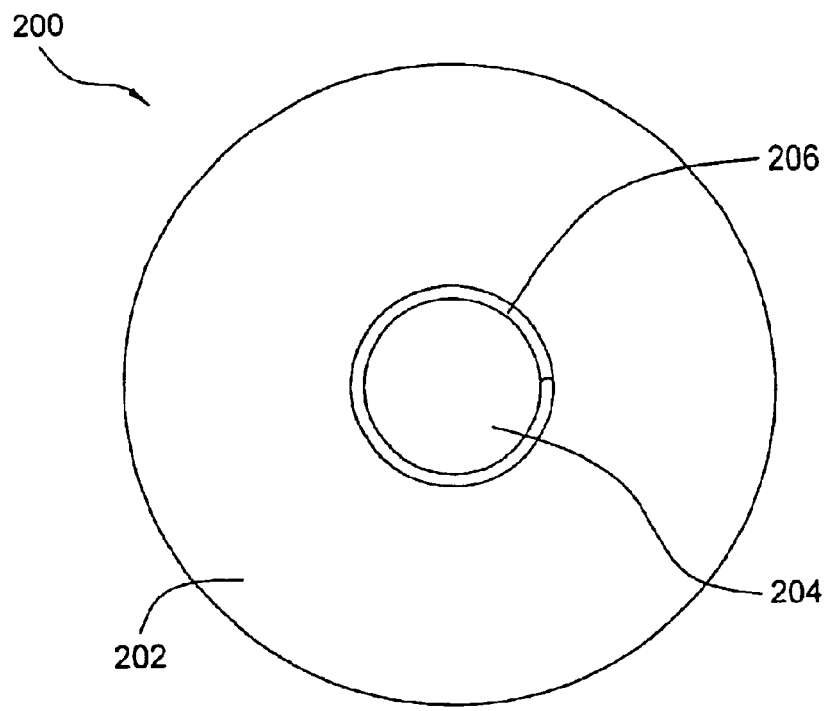
FIGS. 2A and 2B illustrate an enlarged view of a flow diffuser.
Figure 2A:
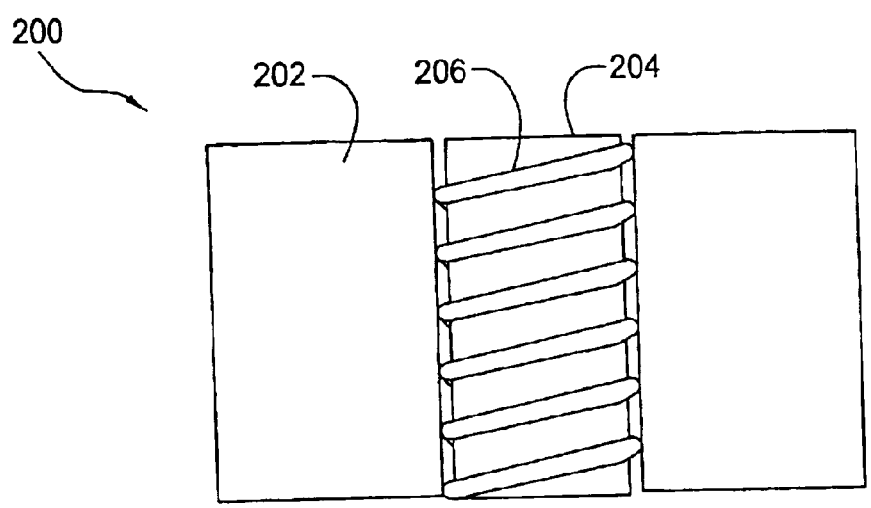

FIGS. 2A and 2B illustrate an enlarged view of a flow diffuser 200, which should have at least one angled surface so that fluid passing through it is deflected, preferably acquiring an angular velocity. The flow diffuser 200 preferably includes an annular housing 202 having a central aperture 204 disposed therein. The stationary vane 206 operates to impart an angular velocity to the portion of the feed stream 104 passing therethrough. For example, the vane 206 should rotate the feed stream 104 resulting in the feed stream exiting the diffuser 200 to leave at an angle that is between horizontal and vertical.

Figure 3B:
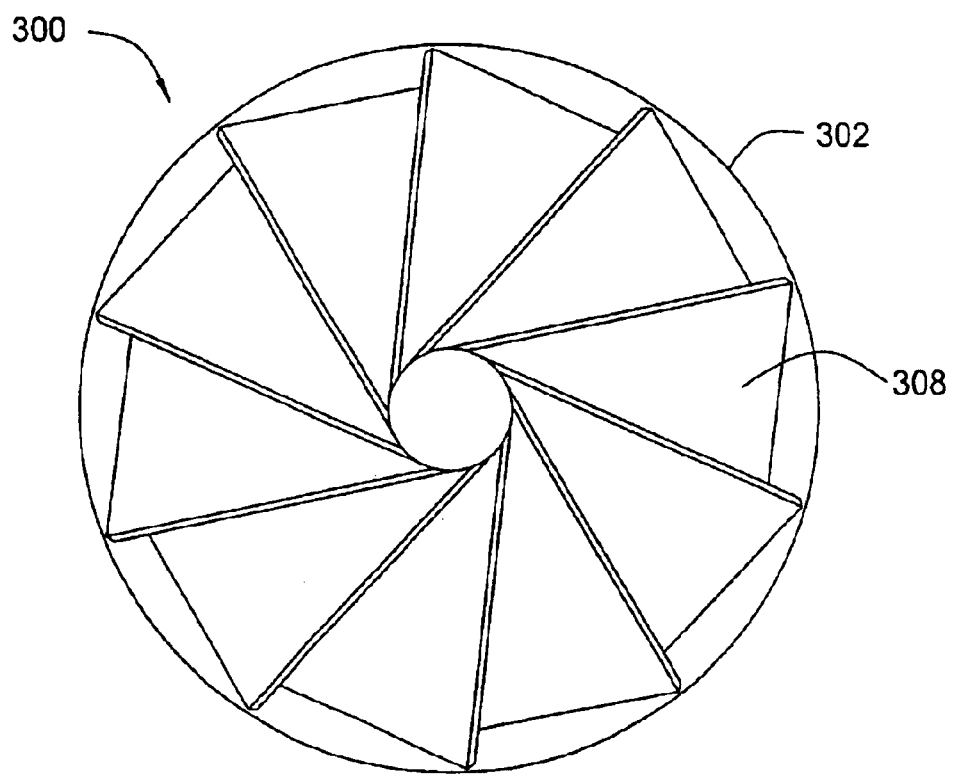
FIGS. 3A and 3B illustrate an enlarged view of another type of flow diffuser.
Figure 3A:
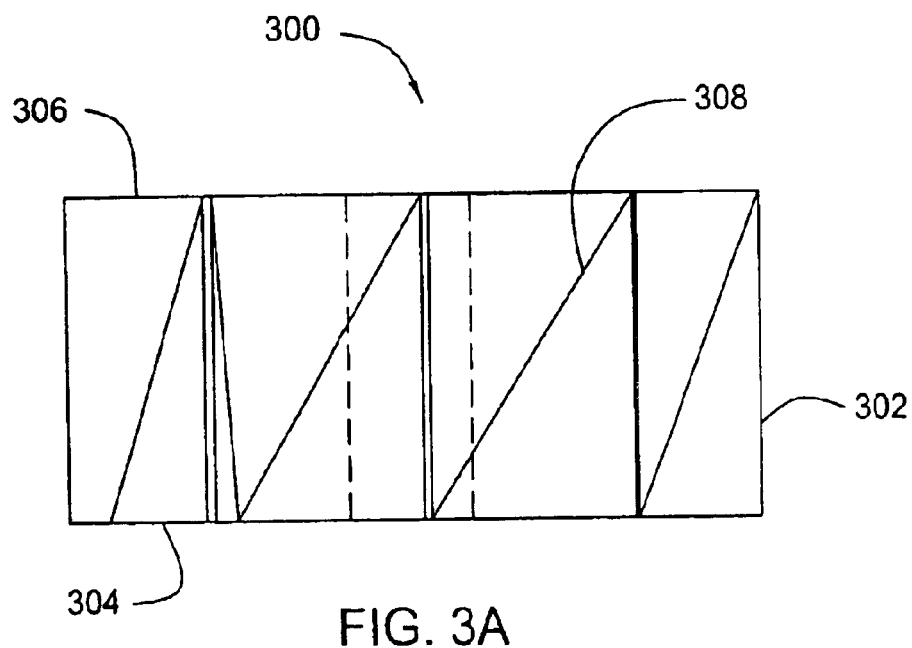

Other types of diffusers can of course be used. FIGS. 3A and 3B illustrate an enlarged view of an alternative flow diffuser 300, which should have at least one angled surface so that fluid passing through it is deflected, preferably acquiring an angular velocity. The flow diffuser 300 preferably includes a housing 302 having a first side 304 and a second side 306. The flow diffuser 300 further has a plurality of angled surfaces 308 formed therein extending from the first side 304 to the second side 306. The number of angled surfaces 308 is preferably 4 or more. The flow diffuser 300 further includes a plurality of inlets 106 disposed in the first side 304 of the housing 302 and a plurality of outlets disposed in the second side 306 of the housing 302 configured to impart an angular velocity to the feed stream passing therethrough. The inlet 106 and the outlet are preferably disposed at different circumferential positions of the diffuser 300, resulting in the central portion of the feed stream 104 passing therethrough traveling at an angle of less than about 90 degrees and greater than about 0 degrees. The angle of each angled surface 308 may be essentially the same or the angle may vary depending on system requirements.

The flow diffuser preferably provides a level of entrainment that is essentially uniform over the mixing chamber cross-section. The level of entrainment of the liquid may be measured by the turbulence of the fluid, using the Reynold's Number. As used herein, the Reynold's number is equal to the following equation:

$$N_{Re} = D \cdot v \cdot \rho / \mu \quad (1);$$

Wherein D is equal to the length of the mixing zone 108, $\mu$ is equal to the viscosity of the mixed feed stream 104, $\rho$ is equal to the density of the mixed feed stream 104, and v is equal to the velocity of the feed stream 104.

Preferably, passing the feed stream 104 through the member 102, e.g., diffuser 200 or diffuser 308. Thus, the flow in all portions of the feed stream 104 is preferably turbulent. Alternative embodiments of the invention contemplate utilizing the flow diffuser without the annular disk 118. Preferably, the annular disk 118 is used in combination with the flow diffuser to provide an adequate velocity to the feed stream 104 as it passes through the perforations in the distributor plate 112.

Having now fully described this invention, it will be appreciated by those skilled in the art that the invention can be performed within a wide range of parameters within what is claimed, without departing from the spirit and scope of the invention. Where applicable all patents, applications, and publications cited herein, including those relied upon for priority, are herein incorporated by reference.

What is claimed is:

1. A polymerization process, comprising;
    passing a feed stream comprising liquid and gas through a feed stream inlet disposed proximate an upflow polymerization reactor;
    passing the feed stream through a member configured to impart an angular velocity to the feed stream and entrain the liquid in the gas; and
    contacting the feed stream with a catalyst to polymerize the feed stream.

2. The process of claim 1, wherein the member is substantially flat and includes a plurality of apertures and wherein the feed stream passes through the plurality of apertures, which imparts the angular velocity to the feed stream.

3. The process of claim 1, wherein the member includes housing having an aperture comprising a stationary vane and wherein the feed stream passes through the aperture, which imparts the angular velocity to the feed stream.

4. The process of claim 1, further comprising passing at least a portion of the feed stream through a plate having a channel disposed therein prior to passing the feed stream through the member.

5. The process of claim 1, wherein a pressure drop exists between the feed stream inlet and the catalyst of from about 5 psig to about 7 psig.

6. The process of claim 1, wherein the feed stream comprises less than about 25% liquid.

7. The process of claim 1, wherein the feed stream passing through the member has substantially the same angular velocity at different radial member locations.

8. The process of claim 1, wherein the feed stream passing through the member has multiple angular velocities at different radial member locations.

9. A polyethylene polymerization process, comprising;
    passing a ethylene feed stream comprising a liquid and gas mixture that includes ethylene monomers through a feed stream inlet disposed proximate an upflow polymerization reactor;
    passing the ethylene feed stream through a member configured to impart an angular velocity to the ethylene feed stream and further mix the liquid in the gas, providing an entrained ethylene feed stream; and
    contacting the entrained ethylene feed stream with a catalyst to polymerize the monomers and to form polyethylene.

10. The process of claim 9, wherein the catalyst is a metallocene catalyst.

11. The process of claim 10, wherein the metallocene catalyst is supported.

12. The process of claim 11, wherein the support is selected from the group consisting of silica, alumina, silica-alumina, and mixtures thereof.

13. The process of claim 12, wherein the support is silica.

14. An upflow polymerization reactor, comprising:
    a housing having a lower region and an upper region, the upper region and lower region being separated by a catalyst bed;
    a feed stream inlet disposed proximate the lower region of the housing configured to pass a feed stream therethrough comprising liquid and gas;

a fluid outlet disposed proximate the upper region of the housing; and a member mounted in the housing between the feed stream inlet and the catalyst bed comprising a plurality of apertures positioned at an angle of greater than about 0 degrees and less than about 90 degrees from horizontal.

15. The reactor of claim 14, wherein the apertures are positioned at an angle of from about 30 degrees to about 60 degrees from horizontal.

16. The reactor of claim 14, wherein the apertures are positioned at substantially the same angle from horizontal.

17. The reactor of claim 14, wherein the apertures are positioned at different angles from horizontal.

18. The reactor of claim 14, further comprising a plate mounted in the housing proximate the feed stream inlet and below the member having a channel disposed therein.

19. The reactor of claim 14, further comprising a plate mounted in the housing proximate the feed stream inlet and below the member having a channel disposed therein and being operably connected to the member.

20. The reactor of claim 14, further comprising a plate mounted in the housing proximate the feed stream inlet and below the member having a channel disposed therein and being integral with the member.

* * * * *